United States Patent [19]
Cooper

[15] 3,660,150
[45] May 2, 1972

[54] COATED WOVEN MATERIALS
[72] Inventor: Michael Lakin Cooper, Welwyn Garden City, England
[73] Assignee: Imperial Chemical Industries Limited, London, England
[22] Filed: May 21, 1970
[21] Appl. No.: 39,550

[30] Foreign Application Priority Data

June 2, 1969 Great Britain......................27,720/69
June 2, 1969 Great Britain......................27,721/69

[52] U.S. Cl....................117/138.8 E, 117/161 UZ, 161/92, 161/402, 229/53
[51] Int. Cl.........................................B44d 1/00, D03d 1/04
[58] Field of Search...........................161/92, 170, 252, 402; 99/171 LP; 117/138.8 E, 161 UZ; 139/420 R; 260/896, 897 A

[56] References Cited

UNITED STATES PATENTS

| | | | |
|---|---|---|---|
| 3,445,055 | 5/1969 | Port et al. | 161/92 |
| 2,983,704 | 5/1961 | Roedel | 117/138.8 E |
| 3,218,224 | 11/1965 | Osborn | 161/402 |
| 3,036,987 | 5/1962 | Ranalli | 117/138.8 E |
| 2,683,138 | 7/1954 | Goering et al. | 260/896 |
| 3,200,173 | 8/1965 | Schilling | 260/897 A |
| 3,176,052 | 3/1965 | Peticolas | 260/897 A |

*Primary Examiner*—Robert F. Burnett
*Assistant Examiner*—Linda C. Koeckert
*Attorney*—Cushman, Darby & Cushman

[57] ABSTRACT

A web of woven tapes of crystalline polyolefines coated with a blend containing at least 10 percent by weight of a crystalline polyolefine.

5 Claims, No Drawings

COATED WOVEN MATERIALS

The present invention relates to coated woven materials and in particular to such materials which are suitable for the production of sacks.

It is already known to produce webs by weaving tapes of crystalline polyolefines especially polypropylene. The tapes that are used are generally uniaxially oriented along their length and this uniaxial orientation substantially improves the strength of the tapes along their length and thus the warp and weft tapes together give rise to particularly strong materials. However, for many applications, especially sacks, it is desirable that the material should be impermeable to liquids and vapors in particular to water.

It has already been proposed that sacks made from woven tapes of polypropylene should be coated with polyethylene to render them impermeable to water. It is however important that the coating should adhere firmly to the woven web so that it will not peel off when the laminate is subjected to heavy handling. We have found that the adhesion of low density polyethylene to polypropylene tapes is not sufficient to enable the coated material to be used in applications where it is likely to be subjected to rough handling.

According to the present invention we provide a laminated web consisting of a woven layer and a continuous thermoplastic coating thereon in which the woven layer is made by interweaving tapes made from a crystalline polyolefine and the coating thereon contains at least 10 percent by weight of a crystalline olefine polymer.

The crystalline polyolefine which may be used to produce the tapes used in the woven layers of the present invention include polypropylene, high density polyethylene, poly-4-methyl pentene-1 and poly-3-methyl butene. Alternatively copolymers of the olefines from which these polymers are derived may be used although this is not preferred because the copolymers tend to be more expensive than the homopolymers. Similarly, for economic reasons it is preferred that the crystalline polyolefine by polypropylene or high density polyethylene and polypropylene is particularly preferred because it has good tensile properties.

The coating composition must contain at least 10 percent by weight of a crystalline olefine polymer in order to achieve satisfactory adhesion between the coating and the woven layer. The crystalline olefine polymer which is used may be a homopolymer or a copolymer and may conveniently be selected from those described above as being suitable for the crystalline polyolefine. We prefer that the crystalline olefine polymer in the coating composition is the same as the crystalline polyolefine from which the tapes are made although this is not essential. The coating material may be entirely one crystalline olefine polymer, for example if the tapes are of polypropylene we have found that polypropylene is a particularly good coating material. Alternatively the coating composition may be a blend of a crystalline olefine polymer with another olefine polymer. Here again we prefer that the crystalline olefine polymer be the same as the crystalline polyolefine from which the tapes are made. The other olefine polymer which is blended with the crystalline olefine polymer may also be crystalline but we prefer to use non-crystalline polymers such as low density polyethylene and ethylene copolymers such as ethylene vinyl acetate and ethylene methacrylic acid copolymers.

Our preferred blends consist of a crystalline olefine polymer which is the same as the crystalline polyolefine from which the tapes are made and low density polythene. We prefer that these blends contain at least 40 percent by weight of low density polythene as these blends are readily extrudable and extrusion coating is a particularly suitable method for depositing the coating. The blends we use should contain at least 10 percent by weight of the crystalline polyolefine because without this the adhesion between the coating and the woven layer is poor.

The tapes used to produce the woven layer of the webs of the present invention may be made in any suitable manner and may be uniaxially or biaxially oriented. We prefer that the tapes are uniaxially oriented. The tapes may conveniently be prepared by extruding the crystalline polyolefine in the form of a film which may be flat or tubular. The extruded film may then be drawn at a temperature above its melting point to produce a sheet of the required thickness. The sheet is then normally slit into ribbons or tapes of the appropriate width which are then stretched to cause orientation at a temperature below the melting point of the crystalline polyolefine. In the preferred situation where the tapes are uniaxially oriented they are stretched only along their axis. The temperature below the crystalline melting point at which the tapes are stretched depends upon the nature of the crystalline polyolefine. Generally the temperature is no more than 60° C. below the melting point of the crystalline polyolefine. In the case of polypropylene the preferred temperature range for stretching is between 110° C. and 170° C.; preferably between 130° C. to 150° C. The extent to which the polymer is stretched at the temperature below its melting point is normally at least five times and preferably at least seven times. These tapes may then be woven into a web.

The coating may be applied to the woven web by normal extrusion coating techniques in which the coating is extruded from a slot die onto the woven web and is immediately contacted with a water-cooled roll to solidify the coating. If the coating is a blend the components of the blend may be mixed together by a suitable simple mixing technique. Another suitable method for applying the coating is to use a melt-roll coater. In a melt-roll coater the coating material is milled in a two roll mill, the rolls being at a temperature above the melting point of the coating material. The two rolls being driven at different speeds so that the coating material preferentially adheres to the faster roll, the web to be coated is then passed through the nip formed between another roll and the faster roll so that the coating material is transferred to the web. Application by a melt-roll coater is particularly preferred when coating with compositions which contain a major amount of the crystalline polyolefine.

We have found that by employing the coatings of the present invention the adhesion between the coating and the web is so improved that the coated webs may be used in applications where they are subjected to particularly rough treatment. Accordingly the webs are particularly useful for the manufacture of sacks and bale-wraps.

The present invention is illustrated by in no way limited by the following Examples.

EXAMPLES 1 to 5

Samples of cloth which had been woven from tapes of uniaxially oriented polypropylene and which contained 10 tapes per inch of cloth in both the weft and the warp direction were extrusion coated with a blend of polythene and polypropylene. The coating material was extruded at a temperature of about 290° C. onto the web which was travelling at a speed of 130 ft/minute. The final thickness of the coatings was 25 microns.

The adhesion or "peel strength" of the coating was measured on a 1 inch wide strip of the laminate by clamping the coating in one clamp of a tensometer and the cloth in the other clamp, and measuring the force required to pull them apart at a constant speed of 20 cm/min.

|  | % Polythene in Coating | % Polypropylene in Coating | Peel strength grams/inch width |
| --- | --- | --- | --- |
| Example 1 | 100 | 0 | 20 |
| Example 2 | 90 | 10 | 40 |
| Example 3 | 80 | 20 | 60 |
| Example 4 | 70 | 30 | 100 |
| Example 5 | 60 | 40 | 220 |

EXAMPLE 6

A blend containing 60 percent by weight of polythene and 40 percent by weight of polypropylene was coated onto a similar piece of cloth as was used in Examples 1 to 5. The blend was extruded at 295° C. onto the cloth which was travelling at 400 ft/minute to give a coating 12.5 microns thick. The peel strength of the laminate was 190 grams/inch.

EXAMPLE 7

The process of Example 1 was repeated using polypropylene as the coating polymer. The polypropylene coating was extruded at 290° C. onto a woven web travelling at 130 ft/minute, the coating thickness was 25 microns. It was not possible to peel off the coating without destroying the weave.

EXAMPLE 8

The process of Example 7 was repeated with the web travelling at 200 ft/minute.

It was not possible to peel off the coating without destroying the weave.

EXAMPLE 9

Polypropylene powder was fed to the hot rolls of a melt-roll coater, which were maintained at 206° C. on the front roll and 228° C. on the back roll, the front roll being driven at a slightly greater peripheral speed than the back roll. Cloth woven from tapes of uniaxially oriented polypropylene containing 10 tapes per inch of cloth in both weft and warp directions was fed through the nip formed between another roll and the front roll of the coater and was coated with a 40 micron coating of polypropylene at a speed of 30 metres/min. The adhesion of the coating was such that it could not be peeled off without destroying the weave.

EXAMPLE 10

A blend of 80 percent by weight of polypropylene granules and 20 percent by weight of low density polyethylene granules was fed to the hot rolls of a Zimmer melt-roll coater, which were maintained at 206° C. on the front roll and 228° C. on the back roll, the front roll being driven at a slightly greater peripheral speed than the back roll. Cloth woven from tapes of uniaxially oriented polypropylene containing 10 tapes per inch of cloth in both weft and warp directions was fed through a nip formed between another roll and the front roll and was coated with a 40 micron coating of polypropylene at a speed of 20 metres/min. The adhesion of the coating was such that it could not be peeled off without destroying the weave.

I claim:

1. A laminated web consisting of a woven layer and a continuous coating thereon in which the woven layer is made by interweaving tapes made from a crystalline polyolefine and the coating thereon contains at least 10 percent by weight of a crystalline polymer of the same olefine and at least 40 percent by weight of low-density polyethylene.

2. A laminated web according to claim 1 in which the tapes are uniaxially oriented along their axis.

3. A laminated web according to claim 1 in which the crystalline polyolefine is polypropylene.

4. A laminated web according to claim 1 in which the crystalline polyolefine is high density polyethylene.

5. Sacks whenever made from a laminated web according to claim 1.

* * * * *